US010659592B2

(12) United States Patent
VanBlon et al.

(10) Patent No.: US 10,659,592 B2
(45) Date of Patent: May 19, 2020

(54) SWITCHING A COMMUNICATION MODE BASED ON RECIPIENT PREFERENCE

(71) Applicant: LENOVO (Singapore) PTE. LTD., New Tech Park (SG)

(72) Inventors: Russell Speight VanBlon, Raleigh, NC (US); Ryan Charles Knudson, Durham, NC (US); Roderick Echols, Chapel Hill, NC (US); Jonathan Gaither Knox, Morrisville, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/942,147

(22) Filed: Mar. 30, 2018

(65) Prior Publication Data

US 2019/0306301 A1    Oct. 3, 2019

(51) Int. Cl.
*H04W 4/12* (2009.01)
*H04M 1/725* (2006.01)

(52) U.S. Cl.
CPC ......... *H04M 1/72563* (2013.01); *H04W 4/12* (2013.01)

(58) Field of Classification Search
CPC ...................................................... H04W 4/12
See application file for complete search history.

(56) References Cited

U.S. PATENT DOCUMENTS

| 9,253,804 B2* | 2/2016 | Amidon | H04M 3/42374 |
| 2008/0148154 A1* | 6/2008 | Burrell | H04L 12/1895 |
| | | | 715/733 |
| 2012/0096095 A1* | 4/2012 | Bhargava | H04L 51/14 |
| | | | 709/206 |

* cited by examiner

*Primary Examiner* — Michael T Vu
(74) *Attorney, Agent, or Firm* — Kunzler Bean & Adamson

(57) ABSTRACT

For switching a communication mode based on the preference of the communication recipient, methods, apparatus, and systems are disclosed. One apparatus a processor and a memory that stores code executable by the processor. Here, the processor determines that a user is initiating communication with a recipient via a first communication channel and receives a communication channel preference of the recipient. Additionally, the processor prompts the user to switch to a second communication channel in response to the first communication channel not matching the communication channel preference.

20 Claims, 10 Drawing Sheets

SWITCHING A COMMUNICATION MODE BASED ON RECIPIENT PREFERENCE

FIELD

The subject matter disclosed herein relates to electronic communications and more particularly relates to switching a communication mode based on the preference of the communication recipient.

BACKGROUND

Certain digital messages are likely to be disruptive and/or ignored by recipient in some user contexts.

BRIEF SUMMARY

An apparatus for switching a communication mode based on the preference of the communication recipient is disclosed. A method and computer program product also perform the functions of the apparatus.

One apparatus for switching a communication mode based on the preference of the communication recipient includes a processor and a memory that stores code executable by the processor. The processor determines that a user is initiating communication with a recipient via a first communication channel and receives a communication channel preference of the recipient. Additionally, the processor prompts the user to switch to a second communication channel in response to the first communication channel not matching the communication channel preference.

In certain embodiments, the processor permits communication over the first communication channel in response to the first communication channel matching the communication channel preference. In some embodiments, the communication channel preference of the recipient is based on an activity context of the recipient. In further embodiments, the communication channel preference of the recipient may be based on an identity of the user.

In some embodiments, determining that a user is initiating communication with a recipient via a first communication channel includes the processor identifying an opened communication application and identifying a channel type utilized by the communication application. In various embodiments, the channel type may be one of: a voice call, video call, a text message, a short messaging service ("SMS") message, a multimedia messaging service message ("MMS"), an instant message ("IM"), a voice recording, and a video recording.

In certain embodiments, prompting the user to switch to the second communication channel includes the processor identifying an available communication application that uses the second communication channel. Note that the second communication channel matches the communication channel preference. In such embodiments, prompting the user to switch to the second communication channel also includes the processor identifying notifying the user of the communication channel preference and providing a link to the available communication application.

In some embodiments, the processor converts a first communication made using the first communication channel into a second communication that uses the second communication channel in response to the first communication channel not matching the communication channel preference. Moreover, the processor sends the second communication to the user. Here, the conversion may include converting speech to text or converting text to speech. In certain embodiments, receiving the communication channel preference of the recipient includes one or more of: receiving the communication channel preference from a server, receiving the communication channel preference from a device of the recipient, and retrieving the communication channel preference from the memory.

One method for switching a communication mode based on the preference of the communication recipient includes determining, by use of a processor, that a user is initiating communication with a recipient via a first communication mode. The method includes receiving a communication mode preference of the recipient. The method includes prompting the user, e.g., via a user device, to switch communication modes in response to the first communication mode not matching the communication mode preference.

In certain embodiments, determining that a user is initiating communication with a recipient via a first communication mode includes identifying an opened communication application and identifying a communication type utilized by the communication application. Here, the communication type may be a voice call, video call, a text message, a short messaging service ("SMS") message, a multimedia messaging service message ("MMS"), an instant message ("IM"), a voice recording, or a video recording.

In some embodiments, the method further includes permitting communication over the first communication mode in response to the first communication mode matching the one or more communication mode preference. In such embodiments, prompting the user to switch communication modes may include identifying one or more preferred communication types from the communication mode preference of the recipient and determining whether a communication type of the first communication mode matches the one or more preferred communication types. Moreover, prompting the user to switch communication modes includes prompting the user to switch to a highest priority of the one or more preferred communication types in response to the first communication type not matching the one or more preferred communication types.

In certain embodiments, prompting the user to switch communication modes in response to the first communication mode not matching the communication mode preference includes identifying an available communication application that matches the communication mode preference. In such embodiments, prompting the user to switch communication modes may include notifying the user of the communication mode preference and providing a link to the available communication application. In one embodiment, the communication mode preference of the recipient is based on an activity context of the recipient.

In some embodiments, the method also includes converting a first communication made using the first communication mode into a second communication that uses a preferred communication mode and sending the second communication to the user. In such embodiments, the conversion includes one of: converting speech to text and converting text to speech. In certain embodiments, receiving the communication mode preference of the recipient includes one of: receiving the communication mode preference from a server, receiving the communication mode preference from a device of the recipient, and retrieving the communication mode preference from a memory of the user device.

One system for switching a communication mode based on the preference of the communication recipient includes a sender device that initiates communication with a recipient and a recipient device corresponding to the recipient. Here, the recipient device generates a communication preference.

Moreover, the sender device determines that a user is initiating communication with the recipient via a first communication medium and notifies the user of the communication preference in response to the first communication medium not matching the communication preference.

In certain embodiments, the sender device sends a first communication via the first communication medium in response to first communication medium matching the communication preference. In such embodiments, the communication preference is based on one or more of: an activity of the recipient, a location of the recipient, a time of day, a webpage visited by the recipient, and an active application of the recipient device. In some embodiments, the sender device converts a first communication made using the first communication medium into a second communication that uses a second communication medium, in response to the first communication medium not matching the communication preference.

In certain embodiments, notifying the user of the communication preference includes the sender device identifying a first medium type of the first communication medium and one or more preferred medium types from the communication preference and determining whether the first medium type matches the one or more preferred medium types. In such embodiments, the sender device completes the communication over the first medium in response to the first medium type matching the one or more preferred medium types and prompts the user to switch to a second communication medium in response to the first medium type not matching the one or more preferred medium types. Here, the second medium type matches the one or more preferred medium types. In certain embodiments, notifying the user of the communication preference includes the sender device identifying an available communication application that matches the communication preference and providing a link to the available communication application.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
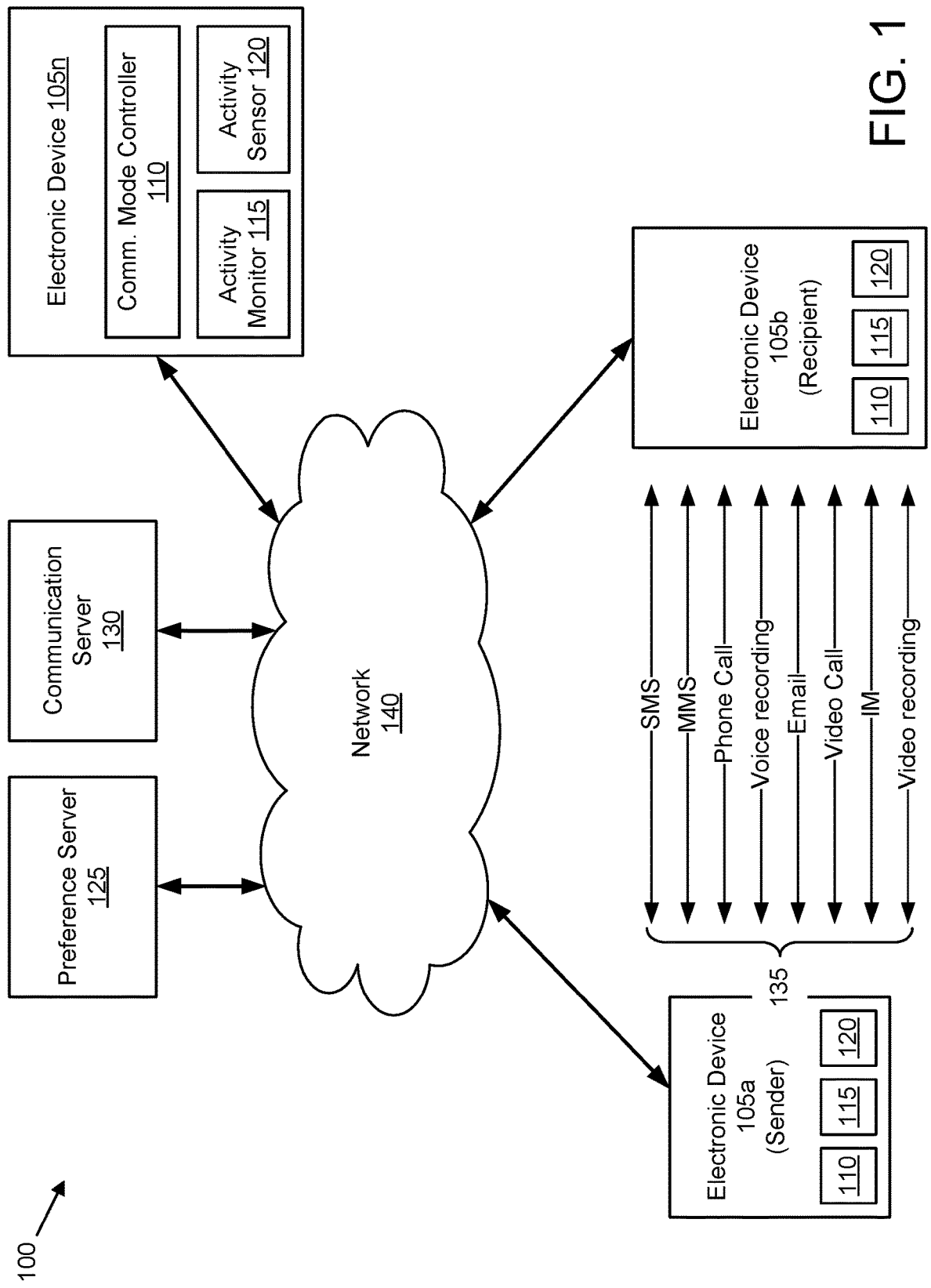
FIG. 1 is a schematic block diagram illustrating one embodiment of a system for switching a communication mode based on the preference of the communication recipient.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a program product embodied in one or more computer readable storage devices storing machine readable code, computer readable code, and/or program code, referred hereafter as code. The storage devices are tangible, non-transitory, and/or non-transmission. The storage devices do not embody signals. In a certain embodiment, the storage devices may employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

For switching a communication mode based on the preference of the communication recipient, methods, systems, and apparatuses are disclosed herein. Certain digital messages, such as text messages, emails, phone calls, or the like, are likely to be disruptive and/or ignored by a recipient in certain user situations (e.g., certain activity contexts). Moreover, senders have little a priori knowledge of the best type of communication at a given time. Thus, a sender is less likely to disrupt the recipient when she knows I had of time the recipient's current communication preference.

Currently, some devices send user status information, such as presence information, however, conventional user status information does not convey information about the types of notifications the recipient is likely to respond to or the types of communications the recipient prefers at the moment communication is initiated. Thus, the present disclosure provides a message sender with modes of communication preferred by the recipient prior to the sender contacting the recipient. When the sender initiates communication via a non-preferred communication mode, the sender is notified of the preferred communication modes of the recipient. Communication modes are variously referred to herein as "communication channels" or "communication media." Examples of communication modes include phone calls, text messages, email, instant messaging, embedded/proprietary chat service, voicemail, and the like.

In one embodiment, if the sender attempts to use a non-preferred communication channel, the sender's device informs the sender that the recipient is likely to ignore the communication. Moreover, the sender device may notify the sender of a preferred communication channel and/or prompt the sender to switch communication channels and/or switch to a different communication application that uses the preferred communication channel. Beneficially, the sender's communication is more likely to be noticed by the recipient. Here, the recipient preferences may be provided as a white list or as a blacklist, for example "no calls" or "texts or emails only."

Nonlimiting examples of recipient preferences include: the recipient preferring calls when driving, the recipient preferring emails when working, the recipient preferring to be left alone while on vacation (e.g., voicemail or email only), the recipient preferring instant messages when using their laptop, the recipient preferring "no calls" would playing tennis or exercising. In this last example, an activity tracker may determine that the recipient is exercising. Alternatively, exercise may be inferred by a GPS location (e.g., the recipient being at a place of exercise). In another example, the recipient may prefer to prevent application switching thus, preferring to receive e.g., Facebook messages when logged into a Facebook webpage or application.

Moreover, the sender may be prompted to deliver message via different communication channel if the initial communication channel does not match the recipient's preference. In certain embodiments, message on one communication channel may be converted to another form, such as voicemail, email, text message, I am, and the like. In certain embodiments, the conversion may be performed by a digital personal assistant. In other embodiments, the conversion may be performed by a communication server.

In one implementation, the sender's device switches from a text messaging app to a phone app (e.g., automatically) if the recipient's context indicates they will ignore text messages (e.g., because the recipient is driving a vehicle). In another implementation, the sender's device allows use of the original communication channel and converts the resulting message to a different form that is preferred by the recipient. In certain embodiments, the conversion may take place "silently" if it is known that the recipient prefers a certain communication channel, e.g., without notification to the sender. In other embodiments, the sender's device shows an indication on the message so that both users are aware of the conversion.

In various embodiments, different senders may be assigned to different preferred mediums. For example, text messages may be the preferred communication mode for friends, and calls may be the preferred communication mode for others. Here, the recipient may configure certain communication modes for stored contacts, as desired. In other embodiments, the configuration may be automatic based on an indicated relationship of the sender to the recipient or a social network "circle" of the recipient to which the sender belongs.

In one example, a sender may attempt to text someone that is driving, here, rather than the sender's device sending the text message and, optionally, the recipient's device auto-replying with the text 'I'm driving, talk later,' the sender device will stop the sender upon determining the attempt to text message and inform the sender of the recipient's preference for voice calls. In an alternative example, the sender device will change the communication channel to a voice call based on the recipient's preference.

FIG. 1 depicts a system 100 for switching a communication mode based on the preference of the communication recipient, according to embodiments of the disclosure. The system 100 includes a plurality of electronic devices 105*a-n* (referred to collectively as electronic devices 105). The system 100 also includes a preference server 125 and a communication server 130. In certain embodiments, the preference server 125 and the communication server 130 may be the same server. Here, the electronic devices 105 are shown communicating via a network 140. The network 140 may include one or more data networks, including, but not limited to, telephone networks, local area networks, wireless networks, the Internet, and the like.

The electronic devices 105 are configured to communicate over a plurality of communication media 135. Examples of communication media 135 include, but are not limited to, SMS messaging, MMS messaging, phone calls, voice recording, email, video calls, instant messaging, video recording, and the like. Examples of the electronic device 105 include, but are not limited to, a mobile telephone, a smart phone, a tablet computer, a laptop computer, a desktop computer, a gaming console, or other suitable communication device.

For ease of illustration, the communication media 135 are depicted as between the electronic device 105*a* (e.g., a sender device) and the electronic device 105B (e.g., a recipient device). In certain embodiments, one or more communication media 135 may utilize a direct connection between the sender device and recipient device. However, communication between the electronic devices 105 generally pass through the network 140. Additionally, the communication server 130 may facilitate communication between electronic devices 105 over various of the communication media 135.

The electronic devices 105 include a communication mode controller 110, an activity monitor 115, and one or more activity sensors 120. In various embodiments, the communication mode controller 110 directs a sender device to one of the communication media 135 that is preferred by the recipient device (e.g., a preferred mode of communication). Where the communication involves multiple recipients, the communication mode controller 110 may direct the sender device to a common one of the communication media 135, a most popular one of the communication media 135. In other embodiments, the communication mode controller 110 does not direct the sender device to another communication medium 135 if the communication involves multiple recipients.

As discussed in greater detail herein, the preferred communication media 135 is selected based on an activity context of the recipient device. Here the activity monitor 135 determines the activity context, for example based on data generated by the activity sensor(s) 120. The activity context may be based on one or more of a time a day, a location of the recipient, an application being used by the recipient, movement data for the recipient, and the like.

In some embodiments, each communication medium 135 is associated with a particular communication application on the electronic device 105. Moreover, certain of electronic devices 105 may not have access to one or more communication media 135, e.g., due to not having a corresponding application, not having a subscription required by the network 140, or the like. Accordingly, in some embodiments the preferred mode of communication of the recipient device may include a subset of communication media 135.

Where present, the preference server 125 coordinates distribution of preference information in the system 100. For example, the electronic devices 105 may post communication preferences at the preference server 125. Additionally, the electronic devices 105 may upload activity context information to the preference server 125. Thus, the electronic device 105a, e.g., the sender device, may retrieve communication preference information and/or activity context information of the recipient device (e.g., the electronic device 105b) upon a user (sender) initiating communication with the recipient.

As described in further detail below, the communication mode controller 110 may detect that the user (sender) is initiating communication with the recipient. Here, initiating communication with recipient may include opening a specific communication application, bringing the specific communication application to a forefront (e.g., top/active window) and identifying the recipient within the committee case and application. By detecting the initiation of communication, the electronic device 105a is able to determine whether the communication matches a preference of the recipient and, if needed, notify the sender that the recipient prefers a different mode of communication (e.g., communication over different one of the communication media 135).

Upon detecting initiation of communication with recipient, the electronic device 105a may query the preference server 125 for current preferences of the recipient. In one embodiment, the preference server 125 provides a table, or other data structure, correlating preferred communication media 135 with specific situations and an activity context used for selecting the specific situation. In another embodiment, the electronic device 105a has stored therein a table, or other data structure, correlating preferred communication media 135 to specific situations and the preference server 125 provides a current activity context of the recipient. In other embodiments, the preference server 125 determines a specific communication preference based on the recipient's activity context and sends the specific communication preference to the electronic device 105a.

In certain embodiments, the communication server 130 may facilitate the conversion of a communication using one communication medium 135 into a communication that uses a different communication medium 135, based on the recipient's preferences. For example, the communication server 130 may convert a text message into a voice message (or vice versa). Moreover, the communication server 130 may convert replies from the recipient (e.g., the electronic device 105b) so that it appears to a user of the electronic device 105a that communication is occurring over a first communication medium 135, whereas it appears to the user of the electronic device 105b that communication is occurring over a second communication medium 135.

Figure 2:
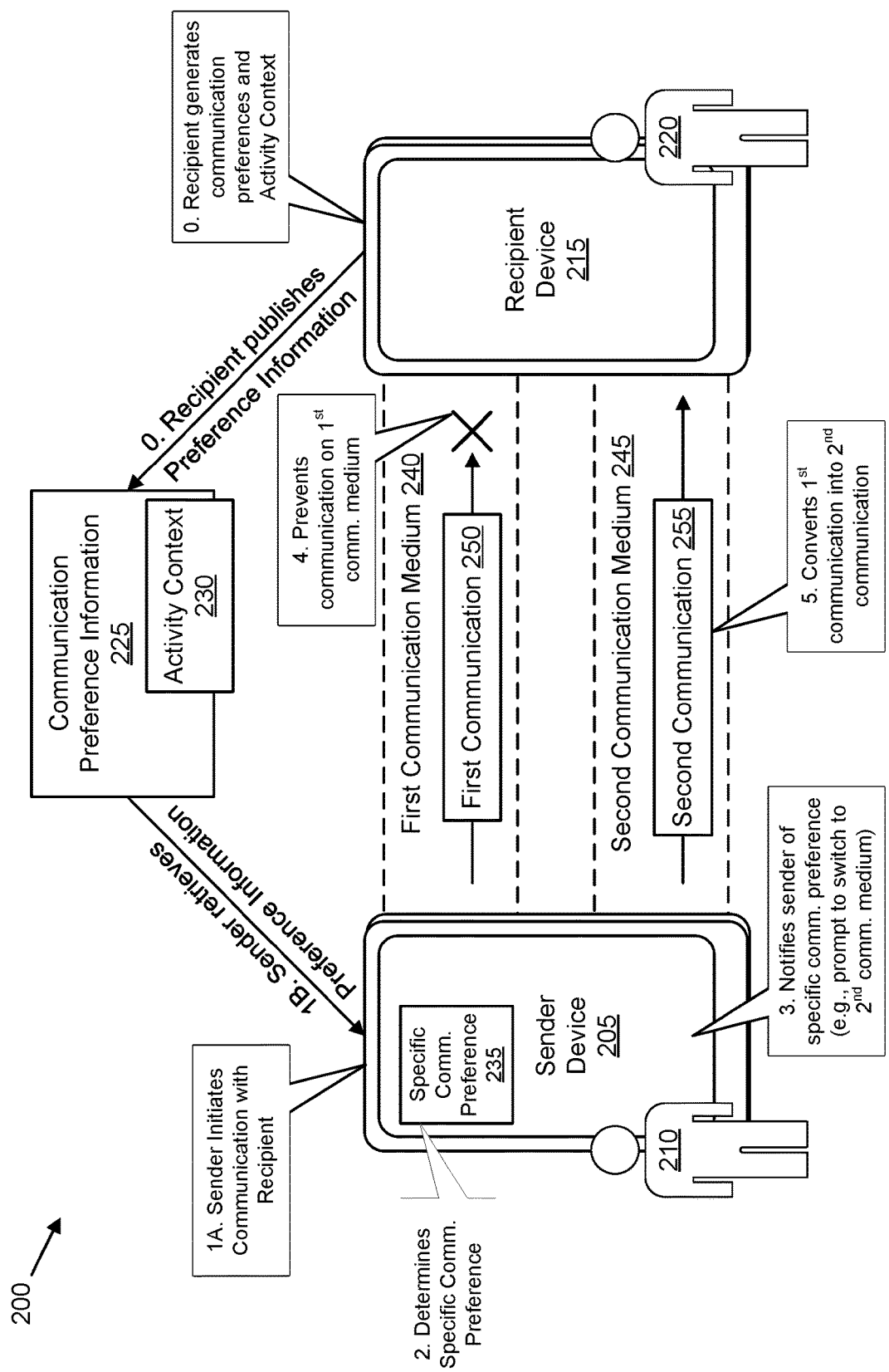
FIG. 2 is a schematic block diagram illustrating another embodiment of a system for switching a communication mode based on the preference of the communication recipient.

FIG. 2 depicts a communication system 200 for switching a communication mode based on the preference of the communication recipient, according to embodiments of the disclosure. The communication system 200, may be one embodiment of the system 100. The communication system 200 includes a sender device 205, here operated by user 215, that initiates communication with a recipient 220 via the recipient device 215. For ease of illustration, networking connections and communication equipment connecting the sender device 205 to the recipient device 215 are not shown here. The sender device 205 may be one embodiment of the electronic device 105a, while the recipient device 210 may be one embodiment of the electronic device 105b.

In the depicted embodiment, the sender device 205 initiates communication with the recipient 220. Note that such communication will be received at the recipient device 215 and presented to the recipient 220. For the sake of clarity, communications between the user 210 and the recipient 220 are understood to be facilitated via the sender device 205 and the recipient device 215. Thus, the user 210 communicating with the recipient to 220 is understood to refer to the user 210 and recipient 220 communicating with one another via the sender device 205 and the recipient device 215, respectively.

Figure 4A:
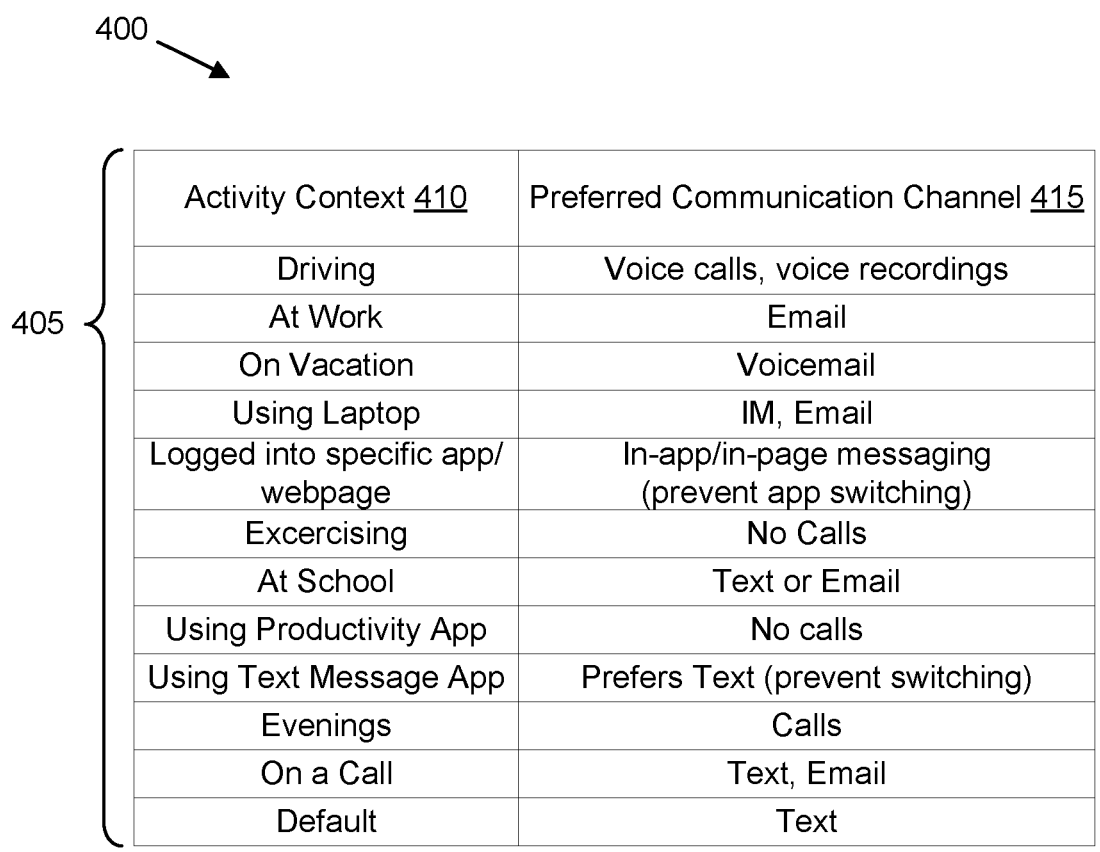
FIG. 4A is a diagram illustrating one embodiment of a data structure storing communication preference information.

The recipient device 215 generates communication preference information 225 which specifies one or more preferred communication media to be used in certain situations (also referred to herein as a "communication channels" and/or a "communication modes"). Examples of preferred communication media include, but are not limited to, a voice call, video call, a text message, a SMS message, a MMS, an IM message, a voice recording, and a video recording. Here, the communication preference information 225 may include a prioritized list of communication media according to specific situations. One example of communication preference information 225 is depicted in FIG. 4A.

In various embodiments, the communication preference information 225 generated by the recipient device 215 also includes an activity context 230 of the recipient 220. Here, the activity context 230 relates to a state of the recipient and may be based on one or more of, a time of day, a location of the recipient 220, a detected activity being performed by the recipient 220, a webpage visited by the recipient 220, and an active application of the recipient device 215, and the like. In one embodiment, the recipient device 210 determines a specific communication preference 235 using the activity context 230. In certain embodiments, the recipient device 215 uploads the communication preference information 225, activity context 230, and/or the specific communication preference 235 to a server (not shown here), such the preference server 125.

Upon the sender 210 initiating communication with a recipient, the sender device 205 determines that a user is initiating communication with the recipient via a first communication medium 240. Moreover, the sender device 205 retrieves preference information of the recipient to 20. Here, the preference information may include the communication preference information 225 and/or the activity context 230. Based on the preference information, the sender device 205 identifies a specific communication preference 235. In one embodiment, the sender device 205 receives the specific communication preference 235, e.g., from recipient device 215 or from a server.

In certain environments, the sender device 205 sends a first communication 245 via the first communication medium 240 in response to first communication medium 240 matching the communication preference 235. Moreover, the sender device 205 may notify the user of the specific communication preference 235 in response to the first communication medium 240 not matching the communication preference 235. Here, the specific communication preference 235 may include one or more communication media.

In certain embodiments, the sender device 205 notifies the sender 210 of the communication preference by identifying an available communication application that matches the communication preference and providing a link to the available communication application. For example, the sender device 205 may present within an editing window of the first communication medium 240 a pop-up window, or other notification, which contains a link or other selectable object (e.g., button, icon, etc.) which opens the matching, available communication application, such as an email client, text messaging client, instant messaging client, phone application, or the like.

In some embodiments, the sender device 205 notifies the sender 210 of the communication preference by identifying a first medium type of the first communication medium 240 and one or more preferred medium types from the communication preference 235. Here, the sender device 205 compares media types to determine whether the first medium type matches the one or more preferred medium types. As noted above, the sender device 205 may proceed with communicating over the first communication medium 240 in response to the first medium type matching the one or more preferred medium types. However, if the first medium type is not one of the preferred medium types, then the sender device 205 may prompt the sender 210 to switch to a second communication medium 245. Here, it is assumed that a medium type of the second communication medium 245 matches the one or more preferred medium types. In certain embodiments, the sender device 205 prevents communication using the first communication medium 240 if the first medium type does not match the one or more preferred medium types.

In one embodiment, the sender device 205 receives the communication preference 235, e.g., from the recipient device 215 or from a preference server (not shown). In another embodiment, the sender device 205 receives communication preference information 225, including activity context 230, from the recipient device 215 or from a preference server and derives the specific communication preference 235. Note that the specific communication preference 235 may be based on one or more of: an activity of the recipient 220, a location of the recipient, a time of day, etc. In certain embodiments, the specific communication preference 235 is further based on the identity of the sender 210. For example, if information for the sender 210 is stored as a contact of the recipient 220, then one communication medium (e.g., voice call) may be preferred by the recipient 220, while if the sender 210 is not a contact of the recipient then another communication medium (e.g., voice message) may be preferred.

In certain embodiments, the sender device 205 may convert a first communication 250 into a second communication 255 for transmitting over the second communication medium 245, where the second communication medium 245 matches the specific communication preference 235. Such a conversion occurs in response to the first communication medium 245 not matching the specific communication preference 235. Here, the first communication 250 is made for distribution over the first communication medium 240. Note that the conversion may involve converting speech-to-text or text-to-speech, depending on the types of communication media involved.

In one embodiment, the conversion is in response to explicit instruction from the sender 210. In other embodiments, the conversion is automatically performed when the first communication medium 240 does not match the specific communication preference 235. In further embodiments, conversion may be performed in the background and/or performed by a communication server. In one embodiment, the sender 210 may be unaware of the conversion. In another embodiment, the sender device 205 informs the sender 210 of the conversion, e.g., after converting the first communication 250 and setting the resulting second communication 255 over the second communication medium 245.

Figure 3A:
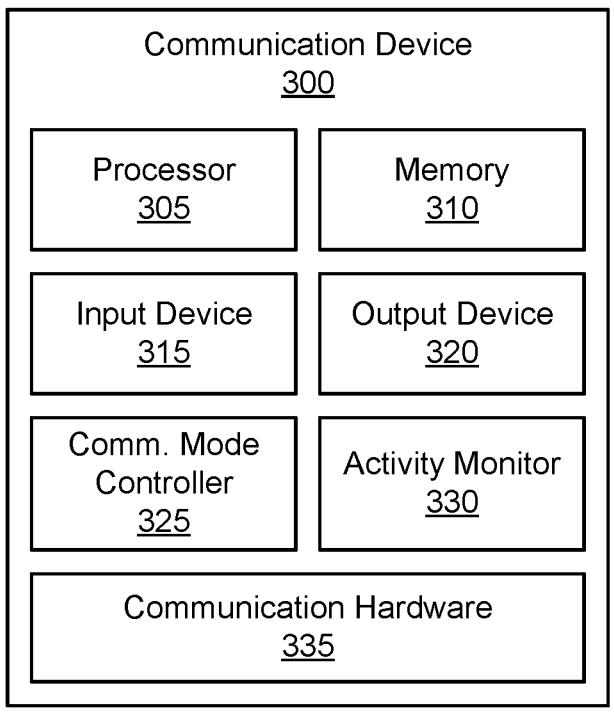
FIG. 3A is a schematic block diagram illustrating one embodiment of an apparatus for switching a communication mode based on the preference of the communication recipient.

FIG. 3A depicts an apparatus for switching a communication mode based on the preference of the communication recipient, according to embodiments of the disclosure. In the depicted example, the apparatus is embodied as a communication device 300. The communication device 300 may be one embodiment of the electronic device 105, discussed above.

Here, the communication device 300 includes a processor 305, a memory 310, an input device 315, an output device 320, a communication mode controller 325, and communication hardware 335. The communication mode controller 325 may be one embodiment of the communication mode controller 110, discussed above. In various embodiments, the communication device 300 may optionally include activity monitor 330. Here, the activity monitor 330 may be one embodiment of the activity monitor 115, discussed above. Accordingly, the communication device 300 may embody the sender device 205 and/or the recipient device 215.

The communication device 300 may include a body or an enclosure, with the components of the communication device 300 being located within the enclosure. Although not depicted, the communication device 300 may include a power source, such as a battery, power supply, or other source of electrical power. Moreover, the components of the communication device 300 are communicatively coupled to each other, for example via a computer bus.

The processor 305, in one embodiment, may comprise any known controller capable of executing computer-readable instructions and/or capable of performing logical operations. For example, the processor 305 may be a microcontroller, a microprocessor, a central processing unit (CPU), a graphics processing unit (GPU), an auxiliary processing unit, a FPGA, or similar programmable controller. In some embodiments, the processor 305 executes instructions stored in the memory 310 to perform the methods and routines described herein. The processor 305 is communicatively coupled to the memory 310, the input device 315, the output device 320, the communication mode controller 325, the activity monitor 330, and the communication hardware 335.

The memory 310, in one embodiment, is a computer readable storage medium. In some embodiments, the memory 310 includes volatile computer storage media. For example, the memory 310 may include a random-access memory (RAM), including dynamic RAM (DRAM), synchronous dynamic RAM (SDRAM), and/or static RAM (SRAM). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media.

In some embodiments, the memory 310 stores data relating to switching a communication mode based on the preference of the communication recipient. For example, the memory 310 may store communication preferences, communication modes associated with specific applications, activity context, and the like. In some embodiments, the memory 310 also stores program code and related data, such as an operating system operating on the communication device 300. In one embodiment, the communication mode controller 325 may be embodied in a software application (or set of software applications) stored in the memory 310 and operating on the communication device 300.

The input device 315, in one embodiment, may comprise any known computer input device including a touch panel, a button, a keyboard, a microphone, a camera, and the like. For example, the input device 315 may include a microphone or similar audio input device with which a user inputs sound or voice data (e.g., voice commands). In some embodiments, the input device 315 (or portion thereof) may be integrated with the output device 320, for example, as a touchscreen or similar touch-sensitive display. In some embodiments, the input device 315 comprises two or more different devices, such as a microphone and a touch panel. The input device 315 may include a camera for capturing images or otherwise inputting visual data.

The output device 320, in one embodiment, is configured to output visual, audible, and/or haptic signals. In some embodiments, the output device 320 includes an electronic display capable of outputting visual data to a user. For example, the output device 320 may include an LCD display, an LED display, an OLED display, a projector, or similar display device capable of outputting images, text, or the like to a user. In certain embodiments, the output device 320 includes one or more speakers for producing sound, such as an audible alert or notification. In some embodiments, the output device 320 includes one or more haptic devices for producing vibrations, motion, or other haptic output.

In some embodiments, all or portions of the output device 320 may be integrated with the input device 315. For example, the input device 315 and output device 320 may form a touchscreen or similar touch-sensitive display. As another example, the input device 315 and output device 320 may form a display that includes haptic response mechanisms. In other embodiments, the output device 320 may be located near the input device 315. For example, a camera, microphone, speakers, and touchscreen may all be located on a common surface of the electronic device 300. The output device 320 may receive instructions and/or data for output from the processor 305 and/or the communication mode controller 325.

The communication mode controller 325, in one embodiment, is configured to initiate communication with the recipient. Alternatively, the communication mode controller 235 may be configured to detect the initiation of communication with the recipient. As discussed in further detail herein, initiating communication with the recipient may include opening an application associated with a first communication mode (e.g., first communication channel). Upon the user initiating communication with a recipient, the communication mode controller 325 determines a first communication mode associated with the communication. Moreover, the communication mode controller 325 identifies a preferred communication mode of the recipient (e.g., based on an activity context of the recipient) and determines whether the first communication mode matches the preferred communication mode.

In some embodiments, if the first communication mode matches the preferred communication mode, then the communication mode controller 325 permits the communication. In certain embodiments, if the first communication mode does not match the preferred communication mode, then the communication mode controller 325 notifies the user of the communication preference of the recipient. For example, the communication mode controller 325 may prompt the user to switch to a second communication mode that matches the communication preference. Said prompt may include a link to an available communication application that uses the preferred communication mode.

In one embodiment, the communication mode controller 325 allows the user to override the recipient's preference and continue with the communication that uses the first communication mode. In another embodiment, the communication mode controller 325 converts a first communication made using the first communication mode into a second communication that uses a second communication mode, where the second communication mode matches a communication preference of the recipient and the first communication mode does not match said communication preference.

The activity monitor 330, in one embodiment, is configured to generate activity context for the communication device 300. Here, the activity context relates to a state of the user and may be based on one or more of, a time of day, a location of the communication device 300, a detected activity being performed by the user, a webpage accessed by the communication device 300, and an active application of the communication device 300, and the like. Here, the activity monitor 330 may be coupled to one or more sensors of the communication device 300 (not shown) and/or one or more sensors worn by the user. The various sensors provide data indicative of the user's activity. Data relevant to the user's activity may include, but is not limited to, movement data, heart rate data, location data, image data, audio data, and the like.

In certain embodiments, the activity monitor 330 accesses calendar data when determining the user's activity context. In certain embodiments, the activity monitor 330 accesses a user's activity history when determining the user's activity context. Moreover, the activity monitor 330 may determine a specific communication preference of the user based on the activity context. Here, the activity monitor 330 may generate communication preferences for the communication device 300 by correlating various activity contexts with one or more preferred communication modes.

Having determined the user's communication preference, the activity monitor 330 may publish the user's communication preference. Additionally, the activity monitor 330 may publish the user's activity context. Here, "publishing"

the communication preference and/or activity context includes uploading the communication preference and/or activity context to a server, to a contacting device, and the like.

The communication hardware 335 may support wired or wireless communication between the communication device 300 and another device or network, such as the network 140. The wireless connection may include a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

Figure 3B:
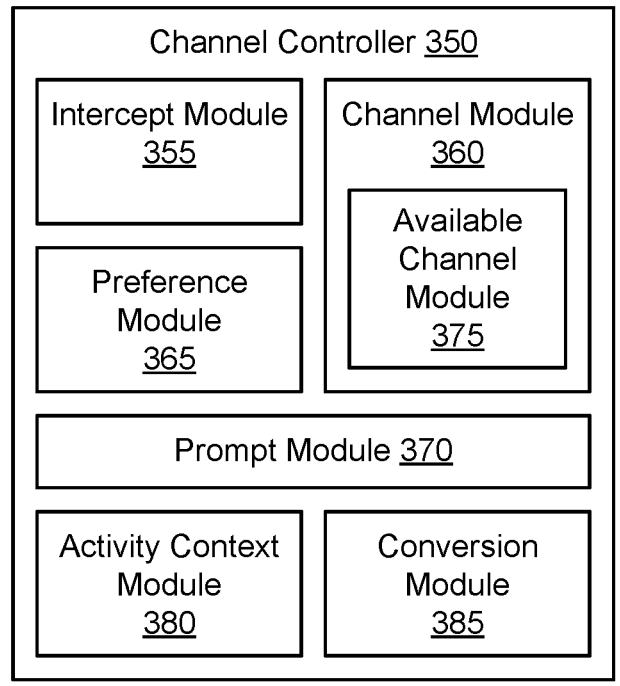
FIG. 3B is a schematic block diagram illustrating one embodiment of a channel controller for switching a communication mode based on the preference of the communication recipient.

FIG. 3B depicts a channel controller 350, according to embodiments of the disclosure. Here, the channel controller 350 may be one embodiment of the communication mode controller 325 and/or communication mode controller 110, described above. In the depicted embodiment, the channel controller 350 includes a plurality of modules, including an intercept module 355, a channel module 360, a preference module 365, a prompt module 370, an available channel module 375, an activity context module 380, and a conversion module 385. As described above, the modules 355-385 may be implemented as a hardware circuit, a programmable hardware device, or software for execution by various types of processors.

The intercept module 355, in one embodiment, is configured to determine that a user is initiating communication with a recipient via a first communication channel. In various embodiments, the intercept module 355 identifies an opened communication application. In some embodiments, the intercept module 355 monitors for a communication application being opened or becoming a top/active application.

As used herein, initiating communication with the recipient refers to the user (e.g., sender) selecting (e.g., opening) a communication application and indicating an intended recipient of a communication to be made using the communication application. For example, when making a voice call, initiating communication with the recipient includes opening a phone application and selecting the recipient (e.g., selecting a contact entry corresponding to the recipient, entering a phone number of the recipient, entering a SIP address of the recipient, etc.). As another example, when sending a text message, initiating communication with the recipient includes opening the text messaging application and selecting a conversation (or beginning a new conversation) with the recipient. In certain embodiments, detecting initiation of communication with the recipient includes detecting that the user has selected a text input field, e.g., of a composition window.

In one embodiment, the intercept module 355 determines that the user is initiating communication with a single recipient. In other embodiments, the intercept module 355 determines that the user is initiating communication with a plurality of recipients. The communication initiated via the first communication channel may be one of: a voice call, video call, a text message, a SMS message, a MMS message, an IM, a voice recording, and a video recording. In one embodiment, the first communication channel is a messaging interface within a website, such as a webpage of a social media network.

The channel module 360, in one embodiment, is configured to determine whether the first communication channel matches a preferred communication channel of the recipient. In certain embodiments, the channel module 360 permits communication over the first communication channel if the first communication channel matches the communication channel preference. However, if the channel module 360 determines that the first communication channel does not match the preferred communication channels recipient, then the channel module 360 may trigger the prompt module 370, where the prompt module 370 notifies the user (sender) of the recipient's preference. The channel module 360 receives data from the preference module 365. In some embodiments, the channel module 360 includes an available channel module 375.

The preference module 365, in one embodiment, is configured to receive a communication channel preference of the recipient. In some embodiments, the preference module 365 receives the communication channel preference directly from the recipient. In another embodiment, the preference module 365 receives the communication channel preference from an intermediary server, such as the preference server 120. Still further, the preference module 365 may search the memory of the sender's device to retrieve the communication channel preference. For example, a contact entry corresponding to the recipient may include the communication channel preference for that recipient. Here, the communication channel preference stored on the sender's device may be updated periodically by the recipient and/or the preference server.

In some embodiments, the communication channel preference of the recipient is based on an activity context of the recipient. In certain embodiments, the preference module 365 receives preference information regarding the recipient and/or activity context information regarding the recipient. From the received information, the preference module 365 then determines one more preferred communication channels. In further embodiments, the communication channel preference is further based on an identity of the sender. For example, a relationship context may be identified as between the sender and the recipient, where the relationship context is used with the activity context to select one or more preferred communication channels using the recipient's preference information. As another example, a class of contact to which the sender belongs to may influence the preferred communication channel.

The prompt module 370, in one embodiment, is configured to prompt the user to switch to a second communication channel in response to the first communication channel not matching the communication channel preference. In various embodiments, prompting the user to switch to the second communication channel includes the prompt module 370 displaying a visual notification, presenting an audio notification, presented a vibration alert, and combinations thereof. For example, the prompt module 370 may present a pop-up window on top of composition field of an application using the first communication channel. Here, the pop-up window may notify the user of the recipient's communication preference and request that the user switch to an application that uses the second communication channel. In some embodiments, the prompt module 370 may allow the user to ignore the prompt and continue communication on the first communication channel despite the recipient's preference to the contrary.

The available channel module 375, in one embodiment, is configured to identify an available communication application that matches the communication channel preference. For example, the available channel module 375 scan a list of installed applications on the communication device in order to select an available communication application. In certain embodiments, the available channel module 375 maintains a table of installed communication applications (e.g., a phone application, an SMS application, an MMS application, a text message application, an IM client, an email client, a video/voice messaging client, etc.) and a mapping of each installed communication application to one or more communication channel types. In certain embodiments, each installed communication application is associated with a single communication channel type. Moreover, the available channel module 375 may provide the prompt module 370 with a link to the available communication apparatus. Here, the prompt module 375 may notify the user of the recipient's communication channel preference and present the provided link so that the user can easily open the available communication application.

The activity context module 380, in one embodiment, is configured to determine an activity context for the channel controller 350. For example, the activity context module 380 may be communicatively coupled to one or more sensors, such as a location/positioning (e.g., GPS) sensor, an accelerometer, a gyroscope, etc. From the various sensor data, the activity context module 380 determines the activity context. For example, certain combinations of sensor data (e.g., biometric sensor data, location sensor data, motion sensor data) may indicate that the user is exercising. As another example, other combinations of sensor data may indicate that the user is resting/sleeping. Moreover, geo-fencing and calendaring principles may also be used to determine the activity context, for example to determine that the user is at school, at a theater, at a church, etc.

Moreover, the activity context module 380 may correlate various user activity contexts with preferred communication modes. For example, the activity context of "driving" may be matched with a preference for voice calls (or a preference against text messages). As another example, the activity context of "exercising" may be matched with a preference for text messages, voice messages, and video messages (or with a preference against real-time communication modes, such as voice calls, video calls, IM, etc.). In certain embodiments, the activity context module 380 may receive specific preferences input from the user. In some embodiments, the activity context module 380 may use various machine learning techniques to correlate user activity contexts with preferred communication modes.

The conversion module 385, in one embodiment, is configured to convert a first communication made using the first communication channel into a second communication that uses a second communication channel. For example, the conversion module 385 may convert the first communication in response to the first communication channel not matching the communication channel preference. In one embodiment, the conversion module 385 converts the first communication after instruction from the user.

In another embodiment, the conversion module 385 automatically converts the first communication after the user instructs the sending of the first indication. For example, the user may hit a "send" button after composing the first communication, wherein the conversion module 305 converts the first communication into a second communication that uses the second communication channel. In certain embodiments, the user is made aware of the conversion. For example, the conversion module 385 may request the prompt module 3702 notify the user of the conversion. In other embodiments, the conversion is "silent" (e.g., is not announced to the user) and/or happens the background. It will be noted that the conversion may include speech-to-text conversion and/or a text-to-speech conversion.

In certain embodiments, the communication module 385 also converts reply messages received from the recipient over the second communication channel into messages of a type used by the first communication channel. For example, a sender sending a text message to her recipient may have the text message converted into a voice message, wherein the communication module 385 converts a return voice message into a text message to be presented to the sender. In resource-limited communication devices, the conversion module 385 may flag the first communication so that a communication server performs the conversion to the second communication (and vice versa). Here, the communication device may send the first message to the communication server via the first communication channel, wherein the communication server converts the first message to the second message and sends the second message to the recipient via the second communication channel.

FIG. 4A depicts an exemplary table 400 containing communication preference information, according to embodiments of the disclosure. Here, the table 400 includes a plurality of entries 405, each entry including an activity context 410 and corresponding preferred communication channels 415. Note that the preferred communication channels 410 may be expressed as a whitelist (e.g., the preferred channels are those listed) or as a blacklist (e.g., the preferred channels include all available except those listed). It should be noted that a particular activity context 410 may be associated with multiple preferred communication channels. For example, certain activity contexts 410 may be associated with a preference for real-time communication modes, while other activity contexts 410 may be associated with a preference for non-real-time communication modes. As another example, certain activity contexts 410 may be associated with a preference for voice/audio communication modes, while other activity contexts 410 may be associated with a preference for text communication modes.

Figure 4B:
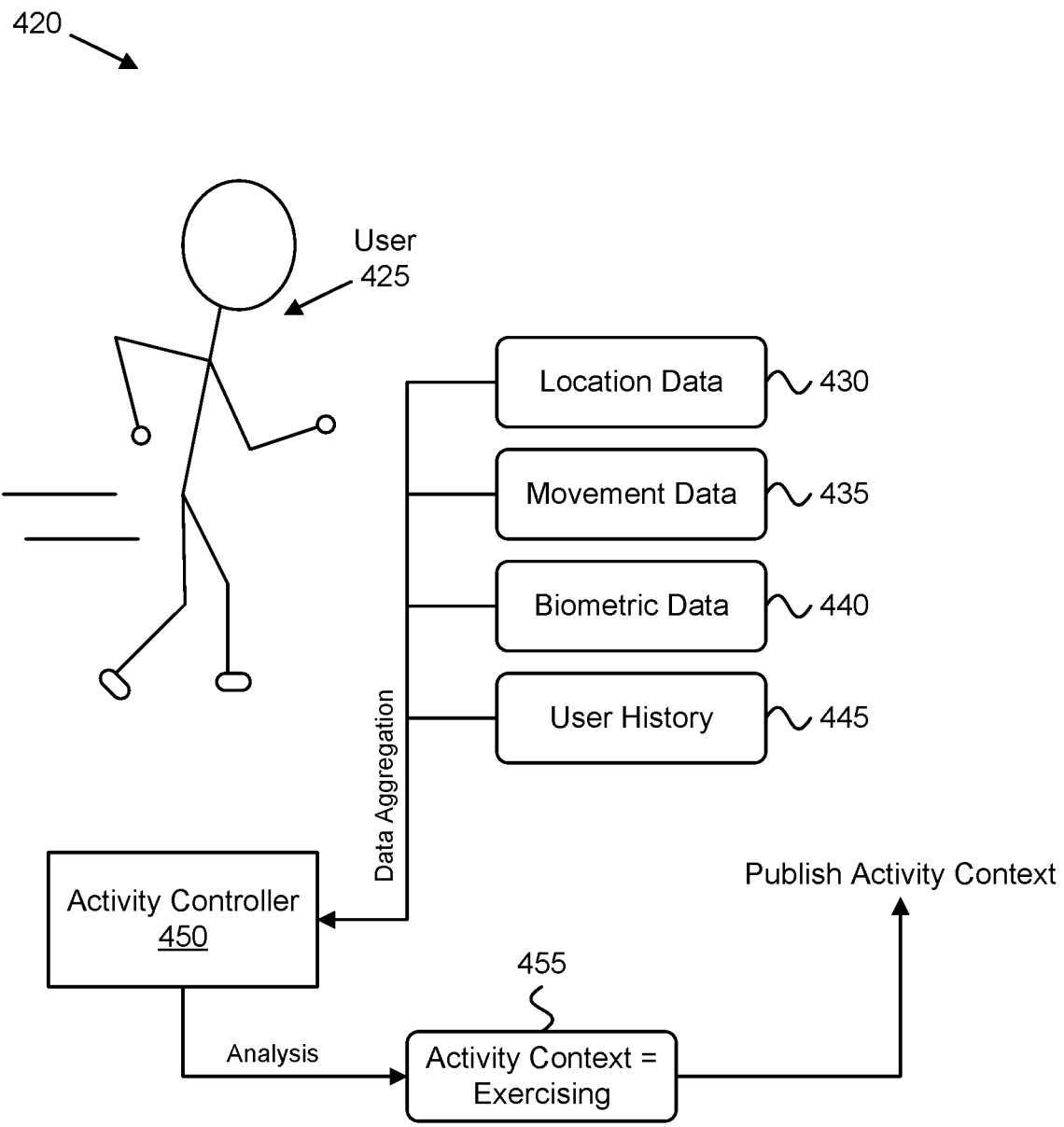
FIG. 4B is a diagram illustrating one embodiment of a recipient device determining an activity context.

FIG. 4B depicts an exemplary scenario 420 of determining an activity context of the user 425. As depicted, data from various sources may be aggregated and analyzed by an activity controller 450. Here, the activity controller 450 collects location data 430, movement data 435, biometric data 440, and a user history 445 for the user 425. The location data 430 refers to a position, e.g., within the world, of the user 425. In various embodiments, the location data 430 may include location coordinates, such as those determined using a global positioning system.

The movement data 435 refers to motion of the user, e.g., relative to a certain position. Here, the movement data 435 may indicate the user is running, walking, stationary, and the like. Additionally, analysis of the movement data 435 may indicate that the user is driving or riding in a vehicle. The biometric data 440 indicates characteristics of the user's body, such as skin temperature, body temperature, heart rate, breathing rate, and the like. The biometric data 440 may be used to distinguish between various of the activity contexts 410, for example distinguishing between the user sleeping and the user being alert, but stationary. The user history 445 may be used to associate certain locations, moving patterns, and the like with specific activity contexts 410.

The activity controller 450 may be one embodiment of the activity monitor 115, the activity monitor 330, and/or the activity context module 480. Here, the activity monitor 450 aggregates the various sensor data to determine the activity context for the user 425. As depicted, from the analysis, the activity controller 435 determines a current specific activity context 455, here that the user 425 is exercising. Moreover, the activity controller 450 may publish the current activity context 455, for example uploading to a server, transmitting to a contact, transmitting to a sender device, and the like.

Figure 5A:
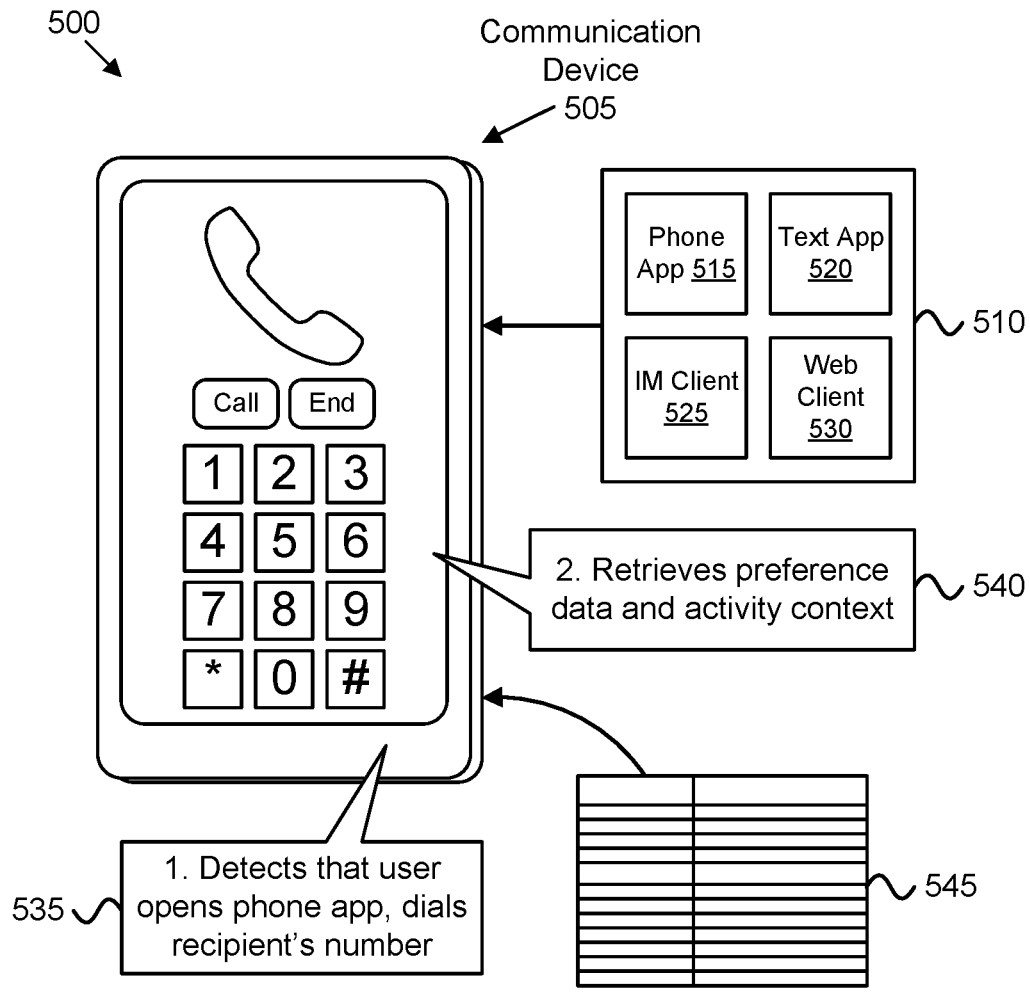
FIG. 5A is a diagram illustrating one embodiment of a sender device notifying the user of a recipient's communication preference responsive to a first communication mode not matching the recipient's preferred communication mode.
Figure 5B:
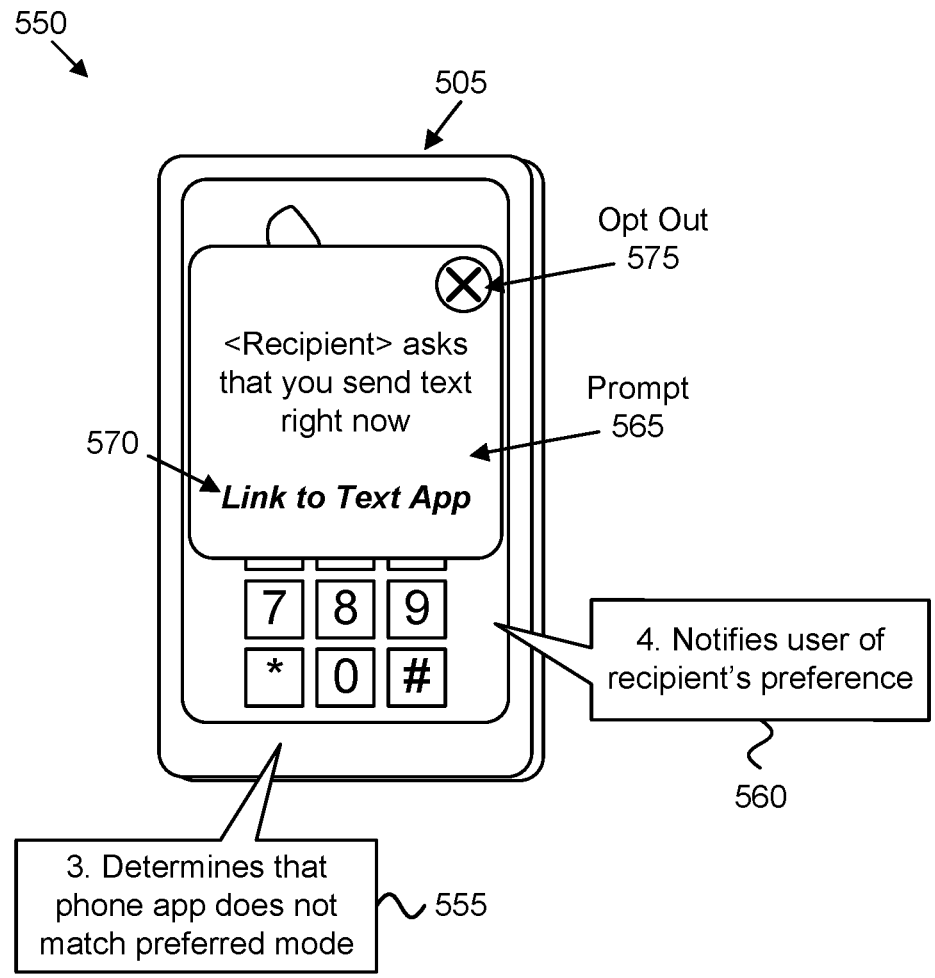
FIG. 5B is a diagram illustrating another embodiment of a sender device notifying the user of a recipient's communication preference responsive to a first communication mode not matching the recipient's preferred communication mode.

FIGS. 5A-5B depict a communication device 505 switching a communication mode based on the preference of the communication recipient, according to embodiments of the disclosure. FIG. 5A depicts the first stage 500 of the communication device 505 switching a communication mode based on the preference of the communication recipient. The communication device 505 may be one embodiment of the electronic device 105A, the sender device 205, and/or the communication device 300. The communication device 505 may include an embodiment of the communication mode controller 110, the communication mode controller 330, and/or the channel controller 350.

In various embodiments, the communication device 505 includes a plurality of communication applications 510. Depicted examples of installed communication applications 510 are the phone application 515, text messaging application 520, IM client 525, and web client 530. However, in other embodiments different and/or additional communication applications 510 may be installed on the communication device 505.

In various embodiments, communication device 505 determines that the user (e.g., sender) is initiating communication with the recipient. In the depicted embodiment, the communication device 505 detects the user opening the phone application 515 and dialing the recipient's phone number (see block 535). In response to detecting the communication initiation, the communication device 505 retrieves preference data and activity context for the recipient (see block 540). The preference data may include a table 545 correlating various activity contexts with specific communication preferences, for example as depicted in FIG. 4A.

FIG. 5B depicts a second stage 550 of the communication device 505 switching a communication mode based on the preference of the communication recipient, according to embodiments of the disclosure. Here, the communication device 505 determines that the phone application 515 does not match a preferred communication mode of the recipient (see block 555). In response to the phone application 515 not matching the preferred communication mode, the communication device 505 notifies the user of the recipient's preference (see block 560). In the depicted embodiment, the communication device 505 displays a prompt 565, here a pop-up window displayed on top of the phone application 515. The prompt 565 indicates that the recipient currently prefers to receive text messages. Moreover, the prompt 565 includes a link 5702 the appropriate application that matches the preferred communication mode, for example the text messaging application 520 and/or IM client 525. Still further, the prompt 565 may include an opt-out option 575 allowing the user to proceed using the phone application 515 despite the recipient currently preferring text messages.

Upon receiving the prompt 565, the user may choose to change communication modes and send a text message the recipient. Here, the user may or open a separate text messaging application, alternatively, the user may choose to continue with placing a phone call using the phone application 515 by selecting the opt-out option 575. In certain embodiments, the communication device 505 may convert speech input using the phone application 515 into one or more text messages in response to the user selecting the opt-out option 575 and send the one or more text messages. In other embodiments, the communication device 505 places the phone call in response to the user selecting the opt-out option 575.

Figure 6:
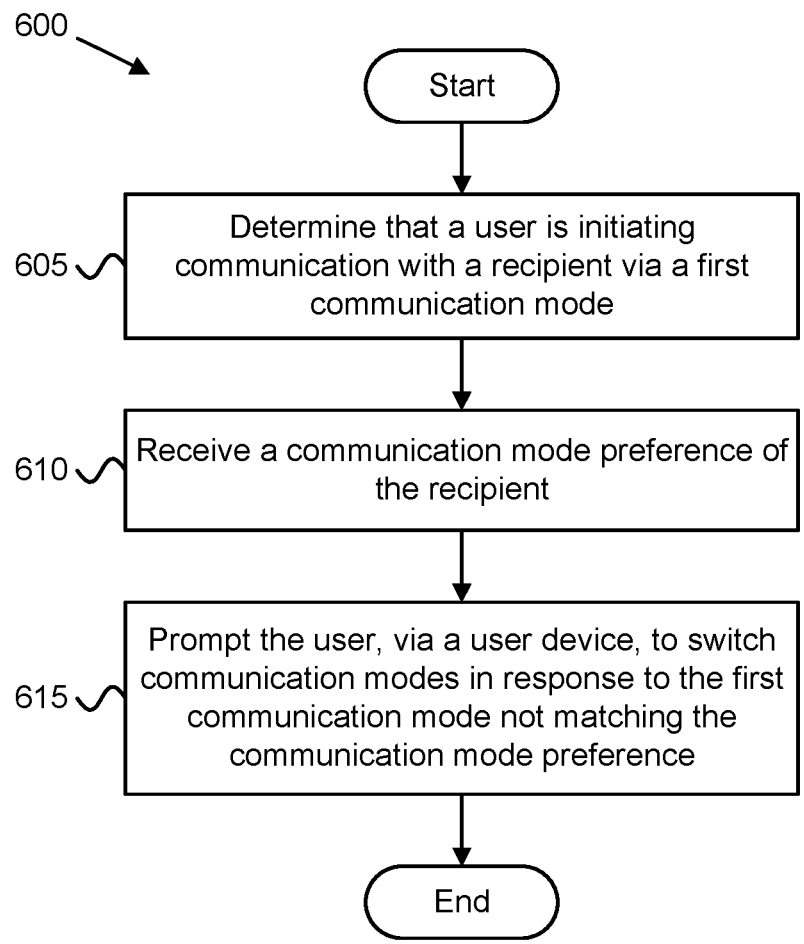
FIG. 6 is a flowchart diagram illustrating one embodiment of a method for switching a communication mode based on the preference of the communication recipient.

FIG. 6 depicts a method 600 for switching a communication mode based on the preference of the communication recipient, according to embodiments of the disclosure. In some embodiments, the method 600 is performed by the electronic device 105, the sender device 205, the communication device 300, the communication mode controller 325, and/or the channel controller 400, described above. In some embodiments, the method 600 is performed by a processor, such as a microcontroller, a microprocessor, a central processing unit (CPU), a graphics processing unit (GPU), an auxiliary processing unit, a FPGA, or the like.

The method 600 begins and determines 605 that the user is initiating communication with the recipient via a first communication mode. In some embodiments, determining 605 that the user is initiating communication with a recipient via a first communication mode includes identifying an opened communication application and identifying a communication type utilized by the communication application. Here, the open communication application corresponds to the first communication mode. Exemplary embodiments of the first communication mode include, but are not limited to, a voice call, video call, a text message, a SMS message, a MMS message, an IM message, a chatroom message, a voice recording, a video recording, and the like.

The method 600 includes receiving 610 a communication mode preference of the recipient. In one embodiment, the communication mode preference is received 610 from the recipient (e.g. via a device of the recipient). In another embodiment, the communication mode preference is received 610 from a server, such as the preference server 120. In further embodiments, the communication mode preference is received 610 from a memory (e.g., retrieved) of the user device. In various embodiments, the communication mode preference of the recipient is based on an activity context of the recipient. In certain bodies, the communication mode preference is for the based on an identity of the sender.

The method 600 includes a prompting 615 the user to switch communication modes in response to the first communication mode not matching the communication of preference. Here, the prompt may be communicated via the user device, for example as audible and/or visual alert, a pop-up window, and the like. The method 600 ends.

In some embodiments, prompting 615 the user to switch communication modes includes identifying one or more preferred communication types from the communication mode preference of the recipient, determining whether a communication type of the first communication mode matches the one or more preferred communication types, and prompting the user to switch to a highest priority of the one or more preferred communication types in response to the first communication type not matching the one or more preferred communication types.

In certain embodiments, prompting 615 the user to switch communication modes includes identifying an available communication application that matches the communication mode preference, notifying the user of the communication mode preference, and providing a link to the available communication application. Moreover, prompting 615 user switch communication modes in response the first communication mode not matching a preferred communication mode may also include permitting communication using the first communication mode in response to the first communication mode matching a preferred communication mode.

Figure 7:
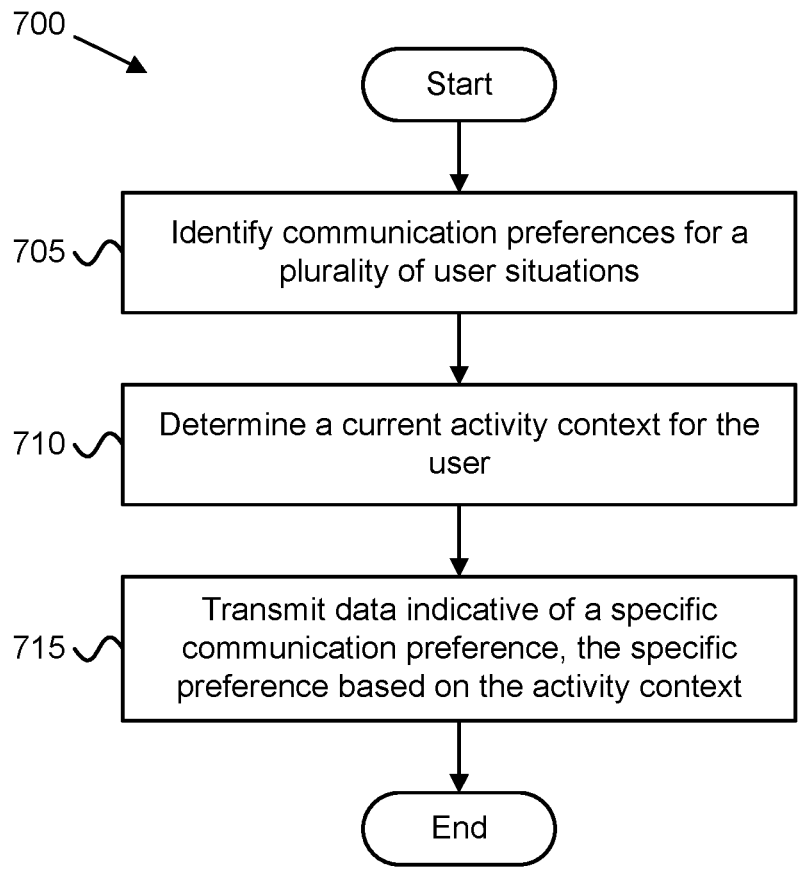
FIG. 7 is a flowchart diagram illustrating one embodiment of a method for determining an activity context.

FIG. 7 depicts a method 700 for switching a communication mode based on the preference of the communication recipient, according to embodiments of the disclosure. In some embodiments, the method 700 is performed by the electronic device 105, the sender device 205, the communication device 300, the communication mode controller 325, and/or the channel controller 400, described above. In some embodiments, the method 700 is performed by a processor, such as a microcontroller, a microprocessor, a central processing unit (CPU), a graphics processing unit (GPU), an auxiliary processing unit, a FPGA, or the like.

The method 700 begins and identifies 705 one or more communication preferences for each of a plurality of user situations. Here, each user situation may correspond to specific activity context, such as driving, being at work, being on vacation, using a laptop, exercising, and the like. Moreover, identifying 705 the one or more communication preferences may include receiving user input linking a specific communication channel/mode to a given user situation. In some embodiments, identifying 705 the one or more communication preferences may include automatically determining the preferences, for example by correlating communication modes used by the recipient during the plurality of user situations. Here, one or more machine learning techniques may be used to automatically identify the communication preferences.

The method 700 includes determining 710 a current activity context for the user. Here, various sensor data may be analyzed to determine the current activity context. Exemplary sensor data may include, but is not limited to, a time of day, a current location, movement data, biometric data, and the like. In certain embodiments, determining 710 the current activity context includes receiving specific input from the user indicating the activity context. For example, a user may use a fitness application to track a current activity, wherein determining 710 the current activity context includes identifying the use of the fitness application and selecting a suitable activity context based on the fitness application.

The method 700 includes transmitting 715 data indicative of a specific communication preference, where the specific communication preferences based on the activity context. In certain embodiments, the data indicative of a specific communication preference is the determined activity context. In certain embodiments, the data indicative of a specific communication preference is a communication mode corresponding to the determined activity context. In other embodiments, the data indicative of the specific communication preference includes both the identified communication preferences and the determined activity context. In some embodiments, transmitting 715 the data indicative of a specific communication preference includes sending said data to a server, such as the preference server 125. In other embodiments, transmitting 715 the data indicative of a specific communication preference includes sending send data to a sender device, for example in response to a query from the sender device. The method 700 ends.

Figure 8:
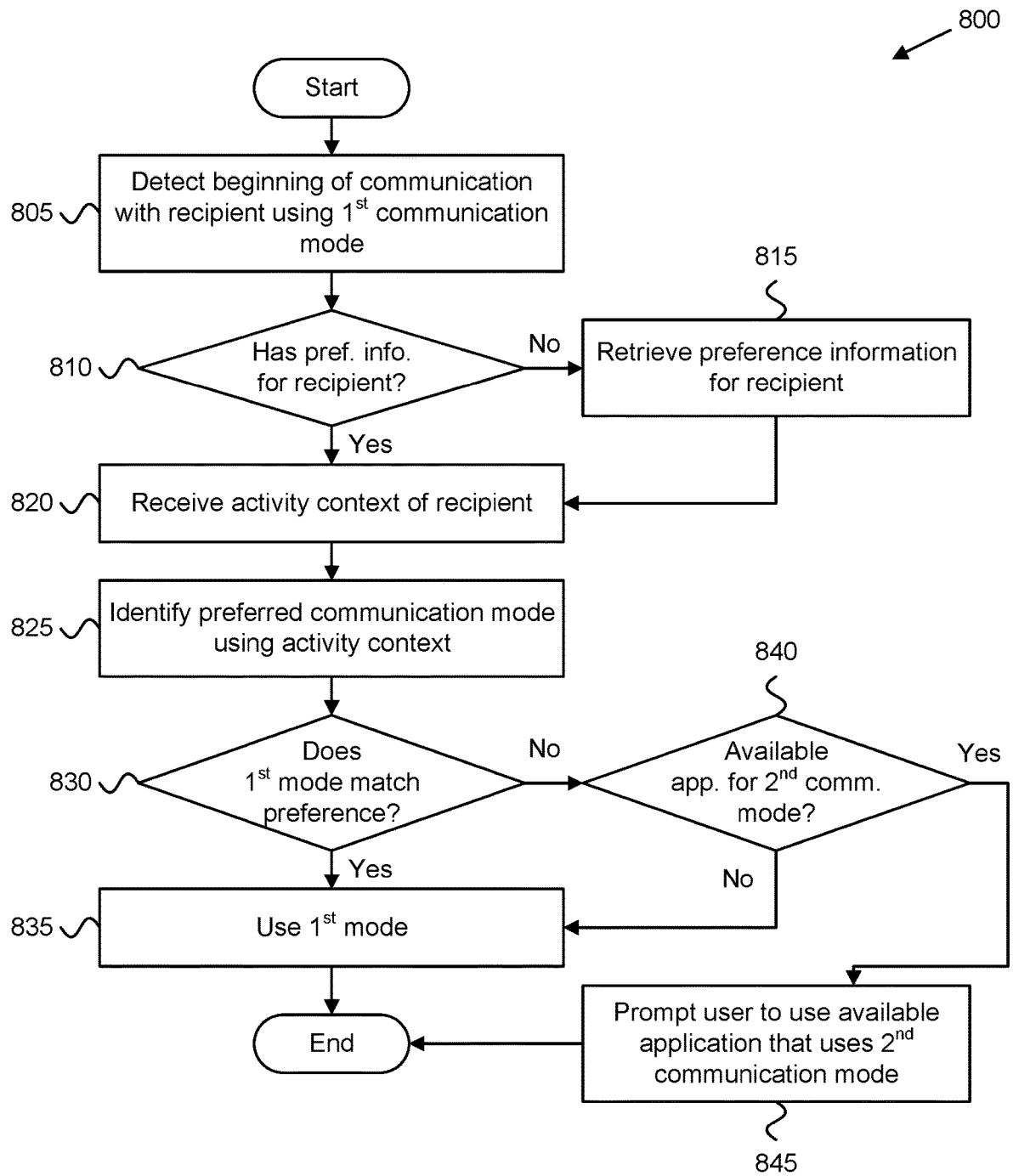
FIG. 8 is a flowchart diagram illustrating another embodiment of a method for switching a communication mode based on the preference of the communication recipient.

FIG. 8 depicts a method 800 for switching a communication mode based on the preference of the communication recipient, according to embodiments of the disclosure. In some embodiments, the method 800 is performed by the electronic device 105, the sender device 205, the communication device 300, the communication mode controller 325, and/or the channel controller 400, described above. In some embodiments, the method 800 is performed by a processor, such as a microcontroller, a microprocessor, a central processing unit (CPU), a graphics processing unit (GPU), an auxiliary processing unit, a FPGA, or the like.

The method 800 begins and detects 805 the beginning of communication with a recipient, said communication using a first communication mode. In various embodiments, detecting 805 the beginning of communication with recipient includes determining, at a sender device, that the user is initiating communication with recipient, as discussed above. Additionally, detecting 805 the beginning of communication with the recipient may include identifying and opened communication application, and identifying selection of the recipient.

The method 800 includes determining 810 whether the sender device has preference information for the recipient. In response to determining 801 that the sender device does not have preference of information for the recipient, the method 800 includes retrieving 815 preference information for the recipient. In one embodiment, retrieving 815 the preference information includes querying a recipient device of the recipient for current preference information. In another embodiment, retrieving 815 the preference information includes querying a preference server for current preference information of the recipient.

In response to the sender device having preference information for the recipient, the method 800 includes receiving 820 an activity context of the recipient. Here, the activity context may be received directly from the recipient or may be received from a server, such as the preference server 125. Where the sender device retrieves preference information for the recipient, said retrieval may include receiving a current activity context.

The method 800 includes identifying 825 a preferred communication mode for the recipient using the activity context. Here, identifying 825 the preferred communication mode may include using the activity context to look up the preferred communication mode from the preference information. In response to identifying a 25 the preferred communication mode, the method 800 includes determining 830 whether the first communication mode matches the preferred communication mode.

If the first communication mode matches the preferred communication mode, then the method 800 uses 835 the first communication mode to communicate with the recipient. Otherwise, if the first communication mode does not match the preferred communication mode, then the method 800 determines 840 whether there is an available application that uses a second communication mode, where the second communication mode matches the preferred communication mode. If such an application is available, then the method 800 includes prompting 845 the user to use the available application which uses the second communication mode. Otherwise, if no such application is available, then the method 800 includes using 835 the first communication mode to communicate with the recipient. The method 800 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor; and
a memory that stores code executable by the processor to:
determine that a user is initiating communication with a recipient via a first communication channel;
receive a communication channel preference of the recipient, the communication channel preference based on a current activity of the recipient; and
prompt the user to switch to a second communication channel in response to the first communication channel not matching the communication channel preference, the second communication channel matching the communication channel preference,
wherein prompting the user to switch to the second communication channel comprises the processor:
identifying a communication application from a list of applications installed on the apparatus, wherein the identified communication application uses the second communication channel;
notifying the user that the recipient currently prefers communication via the second communication channel; and
providing a link to the identified communication application.

2. The apparatus of claim 1, wherein the processor further permits communication over the first communication channel in response to the first communication channel matching the communication channel preference.

3. The apparatus of claim 1, wherein the current activity of the recipient is based on one or more of a time a day, a location of the recipient, an application being used by the recipient, movement data of the recipient, or combinations thereof.

4. The apparatus of claim 1, wherein the communication channel preference of the recipient is further based on an identity of the user.

5. The apparatus of claim 1, wherein determining that a user is initiating communication with a recipient via a first communication channel comprises the processor identifying an opened communication application and identifying a channel type utilized by the communication application, wherein the channel type is selected from the group consisting of: a voice call, video call, a text message, a short messaging service ("SMS") message, a multimedia messaging service message ("MMS"), an instant message ("IM"), a voice recording, and a video recording.

6. The apparatus of claim 1, wherein the processor further converts a first communication made using the first communication channel into a second communication that uses the second communication channel in response to the first communication channel not matching the communication channel preference and sends the second communication to the user, the conversion being selected from the group consisting of: converting speech to text and converting text to speech.

7. The apparatus of claim 1, wherein receiving the communication channel preference of the recipient comprises one or more of: receiving the communication channel preference from a server, receiving the communication channel preference from a device of the recipient, and retrieving the communication channel preference from the memory.

8. The apparatus of claim 1, wherein the processor maintains a table of installed communication applications and a mapping of each installed communication application to one or more communication channel types.

9. A method comprising:
determining, by use of a processor, that a user is initiating communication with a recipient via a first communication mode;
receiving a communication mode preference of the recipient, the communication channel mode based on a current user situation of the recipient; and
prompting the user, via a user device, to switch to a second communication mode in response to the first communication mode not matching the communication mode preference, the second communication mode matching the communication mode preference,
wherein prompting the user to switch to the second communication mode comprises:
identifying a communication application from a list of applications installed on the user device, wherein the identified communication application uses the second communication mode;
notifying the user that the recipient currently prefers communication via the second communication mode; and
providing a link to the identified communication application.

10. The method of claim 9, wherein determining that a user is initiating communication with a recipient via a first communication mode comprises:
identifying an opened communication application; and
identifying a communication type utilized by the communication application, wherein the communication type is selected from the group consisting of: a voice call, video call, a text message, a short messaging service ("SMS") message, a multimedia messaging service message ("MMS"), an instant message ("IM"), a voice recording, and a video recording.

11. The method of claim 9, the method further comprising permitting communication over the first communication mode in response to the first communication mode matching the one or more communication mode preference, wherein prompting the user to switch communication modes comprises:
identifying one or more preferred communication types from the communication mode preference of the recipient;
determining whether a communication type of the first communication mode matches the one or more preferred communication types; and
prompting the user to switch to a highest priority of the one or more preferred communication types in response to the first communication type not matching the one or more preferred communication types.

12. The method of claim 9, further comprising:
converting a first communication made using the first communication mode into a second communication that uses a preferred communication mode, wherein the conversion is selected from the group consisting of: converting speech to text and converting text to speech; and
sending the second communication to the user.

13. The method of claim 9, wherein receiving the communication mode preference of the recipient comprises one or more of: receiving the communication mode preference from a server, receiving the communication mode preference from a device of the recipient, and retrieving the communication mode preference from a memory of the user device.

14. The method of claim 9, wherein the user situation of the recipient is based on an activity context of the recipient indicated by: a time a day, a location of the recipient, an application being used by the recipient, movement data for the recipient, or combinations thereof.

15. The method of claim 9, further comprising maintaining a table of installed communication applications and a mapping of each installed communication application to one or more communication mode types.

16. A system comprising:
a sender device that initiates communication with a recipient; and
a recipient device corresponding to the recipient,
wherein the recipient device generates a communication preference based on a current state of the recipient,
wherein the sender device:
determines that a user is initiating communication with the recipient via a first communication medium;
identifies a communication application that uses a second communication medium in response to the first communication medium not matching the communication preference, the identified communication application being selected from a set of communication applications installed on the sender device, wherein the second communication medium matches the communication preference; and
prompts the user to switch to a second communication medium in response to the first communication medium not matching the communication preference, wherein prompting the user to switch to the second communication medium comprises providing a link to the available communication application.

17. The system of claim 16, wherein the sender device sends a first communication via the first communication medium in response to first communication medium matching the communication preference, wherein the current state of the recipient is selected based on one or more of: an activity of the recipient, a location of the recipient, a time of day, a webpage visited by the recipient, and an active application of the recipient device.

18. The system of claim 16, wherein the sender device converts a first communication made using the first communication medium into a second communication that uses a second communication medium, in response to the first communication medium not matching the communication preference.

19. The system of claim 16, further comprising the sender device:
identifying a first medium type of the first communication medium and one or more preferred medium types from the communication preference;
determining whether the first medium type matches the one or more preferred medium types; and
completing communication over the first medium in response to the first medium type matching the one or more preferred medium types.

20. The system of claim 16, wherein the sender device maintains a table of installed communication applications and a mapping of each installed communication application to one or more communication medium types.

* * * * *